(12) United States Patent
Capelle et al.

(10) Patent No.: US 8,429,905 B2
(45) Date of Patent: Apr. 30, 2013

(54) VEHICLE EXHAUST TREATMENT SYSTEMS

(75) Inventors: Thorsten Capelle, Friedland (DE); Georg Frank, Lengenwang (DE)

(73) Assignee: AGCO GmbH, Marktoberdorf (DE)

( * ) Notice: Subject to any disclaimer, the term of this patent is extended or adjusted under 35 U.S.C. 154(b) by 381 days.

(21) Appl. No.: 12/988,385

(22) PCT Filed: Jan. 22, 2009

(86) PCT No.: PCT/EP2009/000363
§ 371 (c)(1),
(2), (4) Date: Oct. 18, 2010

(87) PCT Pub. No.: WO2009/127278
PCT Pub. Date: Oct. 22, 2009

(65) Prior Publication Data
US 2011/0036079 A1    Feb. 17, 2011

(30) Foreign Application Priority Data

Apr. 19, 2008 (GB) .................................. 0807173.0

(51) Int. Cl.
*F01N 3/36* (2006.01)

(52) U.S. Cl.
USPC .................. 60/303; 60/286; 60/295; 60/298; 60/301

(58) Field of Classification Search .................... 60/282, 60/286, 295, 298, 301, 303
See application file for complete search history.

(56) References Cited

U.S. PATENT DOCUMENTS

2005/0022515 A1*   2/2005  Stiermann ..................... 60/286
2009/0188923 A1*   7/2009  Versaw et al. ................. 220/564

\* cited by examiner

*Primary Examiner* — Thomas Denion
*Assistant Examiner* — Jorge Leon, Jr.

(57) ABSTRACT

A vehicle engine exhaust gas treatment system (10) for use on a tractor comprising storage means (11) for storing urea, injector means (13) for injecting urea into a catalytic converter (21) located in an exhaust (22) of an engine (23), an air duct (29;30) via which air is drawn into the engine, and cooling means for cooling the urea on its passage from the storage means to the injector means, the cooling means comprising a heat exchanger which includes an inner pipe (15; 17) through which the urea flows on its way to the injector means, the inner pipe extending within the air duct (29;30) to cool the urea.

7 Claims, 3 Drawing Sheets

VEHICLE EXHAUST TREATMENT SYSTEMS

The invention relates to treatment systems for treating exhaust gases from an internal combustion engine of a vehicle, particularly, but not exclusively so, a tractor.

It is well known to provide a vehicle exhaust gas treatment system in which a urea solution is injected into a catalytic converter located in the exhaust system of an internal combustion engine, to significantly reduce the level of exhaust pollutants such as carbon monoxide, nitrogen oxide and particulate matter in the exhaust gases.

Problems arise with such treatment systems since if the temperature of the urea exceeds 60° C., due to exposure to the sun or the close proximity of hot components on the vehicle, the urea starts to break down into corrosive constituents which can damage the components of the treatment system.

It is an object of the present invention to provide an improved treatment system which at least mitigates the above problem.

Thus according to the present invention there is provided a vehicle engine exhaust gas treatment system for use on a tractor comprising storage means for storing urea, injector means for injecting urea into a catalytic converter located in an exhaust of an engine, an air duct via which air is drawn into the engine, and cooling means for cooling the urea on its passage from the storage means to the injector means, the cooling means comprising a heat exchanger which includes an inner pipe through which the urea flows on its way to the injector means, the inner pipe extending within the air duct to cool the urea.

Conveniently, on a vehicle such as an agricultural or industrial tractor which is provided with an engine turbo-charger, the inner pipe is exposed to the air which is drawn into the turbo-charger. Typically such air which is drawn in from around the tractor has a maximum temperature of 45° C. and a high mass flow rate of 10-25 cubic meters per minute. Thus this air flow is not heated up significantly on its passage to the turbo-charger. The invention can also be used on non turbo-charged engines.

Normally, air is drawn into the engine via an air filter and, in accordance with the present invention, the inner pipe of the heat exchanger may be located on one or both sides of the air filter to increase the cooling effect on the urea.

If the tractor is provided with an air compressor the urea may be additionally or alternatively cooled by exposing the heat exchanger to the flow of air which is being drawn into the compressor. Typically such air which is drawn into an air compressor reaches a maximum temperature of 45° C. which is the ambient air temperature as explained above.

In a vehicle having a fuel tank for the supply of fuel to an engine of the vehicle and a urea tank for the supply of urea for injection into the engine exhaust system, the urea tank may be located relative to the fuel tank so that the fuel in the fuel tank at least partially insulates the urea from the heating effect of the sun and other heat sources (for example the heating effects of the exhaust of the engine and the cooling system of the engine).

In a preferred construction the urea tank is completely surrounded by the fuel in the fuel tank to obtain the maximum insulating effect from the fuel. Preferably further still, the fuel tank is formed of moulded plastic wherein a wall of the fuel tank comprises a concavity which defines the volume of the urea storage tank, and wherein a closure element covers the concavity.

In accordance with the further aspect of the present invention, there is provided a multi compartment vessel for fixing to a vehicle, the vessel including a fuel tank formed of moulded plastic, wherein a wall of the fuel tank comprises a concavity which defines the volume of a urea storage tank for storing urea, the vessel further comprising a closure element over the concavity.

Advantageously, by forming the fuel tank of moulded plastic with a concavity in this way, the manufacturing and assembly process is simplified.

The present invention will now be described, by way of example only, with reference to the accompanying drawings in which.

Figure 1:
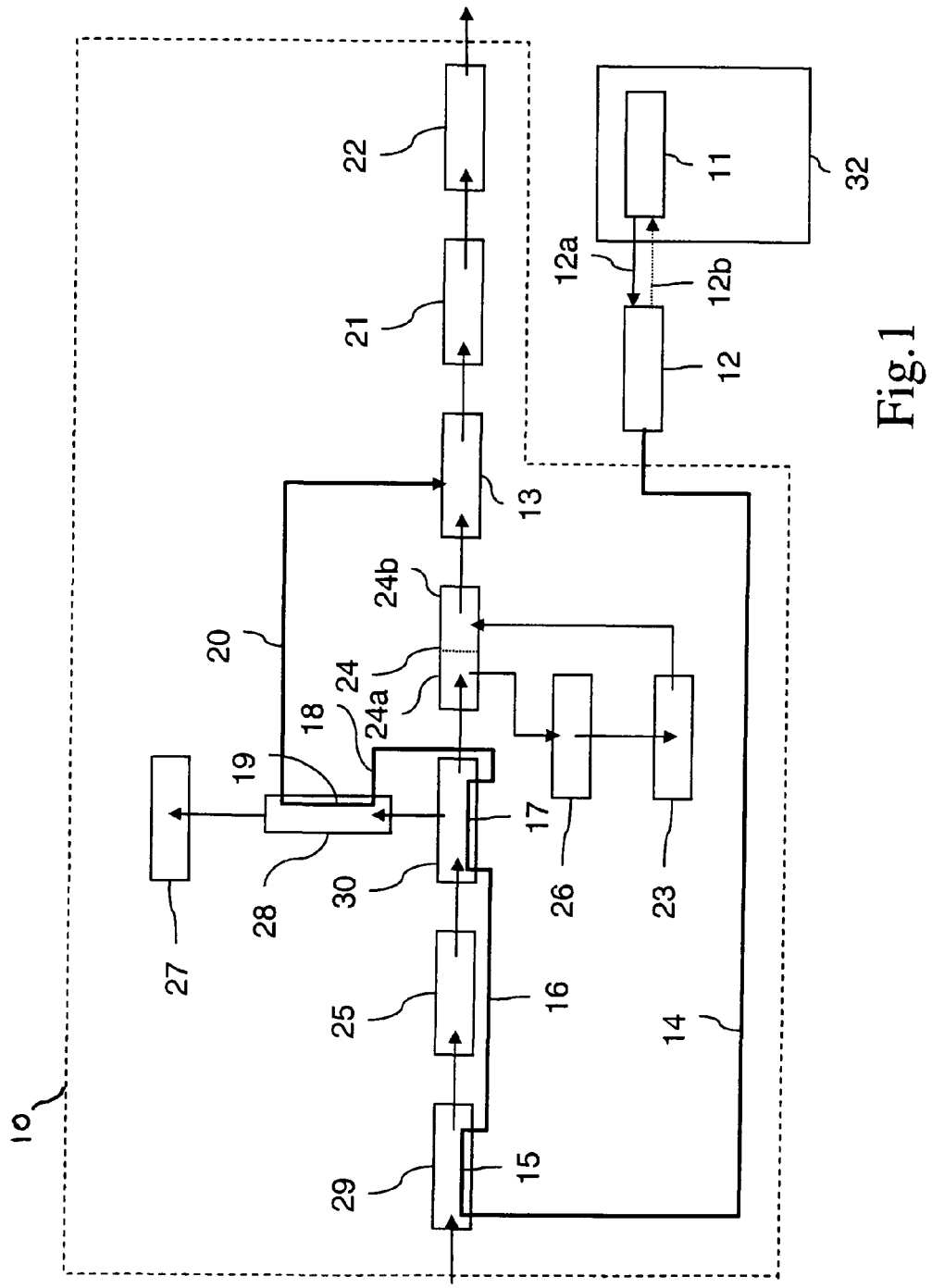
FIG. 1 shows diagrammatically a vehicle exhaust gas treatment system in accordance with the present invention.

Referring to the drawings, an engine exhaust gas treatment system 10 has a urea solution supply tank 11 which supplies a urea supply module 12 which in turn supplies a urea injector 13 via line sections 14 to 20. Injector 13 injects the urea into a Selective Catalytic Reduction (SCR) catalytic converter 21 which is located in the exhaust system 22 of the engine 23. The engine has a turbo-charger 24 which has an input section 24a through which the air drawn through air filter 25 enters the engine via an air cooler 26. The exhaust gases leaving the engine 23 pass through the exit stage 24b of the turbo-charger in a conventional manner and then flow past the injector 13 and through the catalytic converter 21 on their way to the exit of the exhaust system 22.

The vehicle is also provided with an air compressor 27 to power various pneumatic functions on the vehicle such as air brakes and an air suspension system for the cab. This air compressor is fed with air via a duct 28 which receives air via the air filter 25.

The air which is drawn into the turbo-charger intake stage 24a passes through duct 29 before passing through air filter 25 and the further duct 30 after passing through the air filter.

In accordance with the present invention, the urea passes from the supply module 12 to the injector 13 via fine sections 15, 17 and 19 at which locations the urea flowing through the sections 15, 17, and 19 is exposed to the air flowing through air ducts 29, 30 and 28 respectively.

Figure 5:
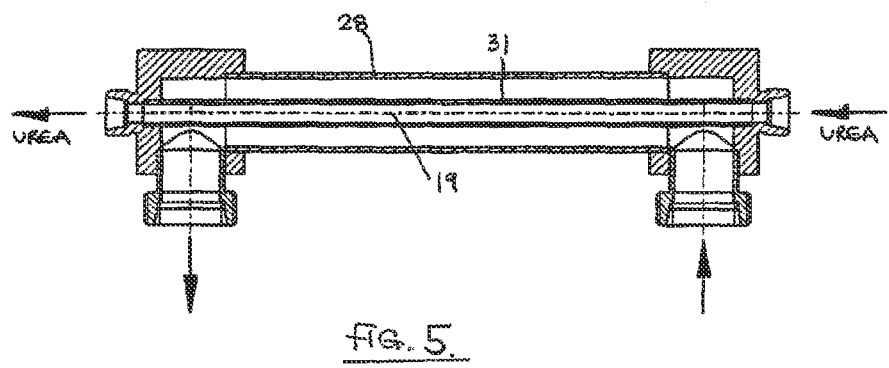
FIG. 5 shows details of a heat exchanger associated with a compressor air supply duct.

FIG. 5 shows details of a heat exchanger arrangement which can be used in connection with the air duct 28 which supplies air to the compressor 27. In this arrangement a heat exchange core is provided by a pipe 31 which forms the section 19 of the supply line and which exposes the urea to the cooling effect of the air which is being drawn into the air compressor 27 via the duct 28.

Similarly in sections 15 and 17 of the supply line a pipe through which the urea flows can be arranged to extend within air ducts 29 and 30 in order to be exposed to the air flowing through air ducts 29 and 30 respectively.

As will be appreciated since the air which is drawn into the engine normally has a maximum temperature of 45° C. this should maintain the temperature of the urea well below the critical 60° C. temperature at which decomposition occurs.

Although in the arrangement described above the urea is cooled in ducts 29, 30 and 28 it may, for example, only be cooled in duct 29 or 30, i.e. before or after passage through the air filter 25 and in machines which are not provided with an air compressor the further cooling in duct 28 will not occur.

Conversely, if the cooling effect is adequate, the urea may only be cooled using the air which is to be drawn into the compressor via duct 28.

The urea in tank 11 is further shielded from the effects of the sun and other influences by locating the urea tank 11 such that the fuel in the fuel tank 32 of the vehicle at the least partially insulates the urea from the heating effects of the sun and the heating effects of the exhaust of the engine. This tank arrangement also provides insulation from the heat coming from the cooling system of the engine as the cooling air may be directed downwardly after passing through the engine bay to an area where the fuel tank or tanks are often positioned.

Figure 2:
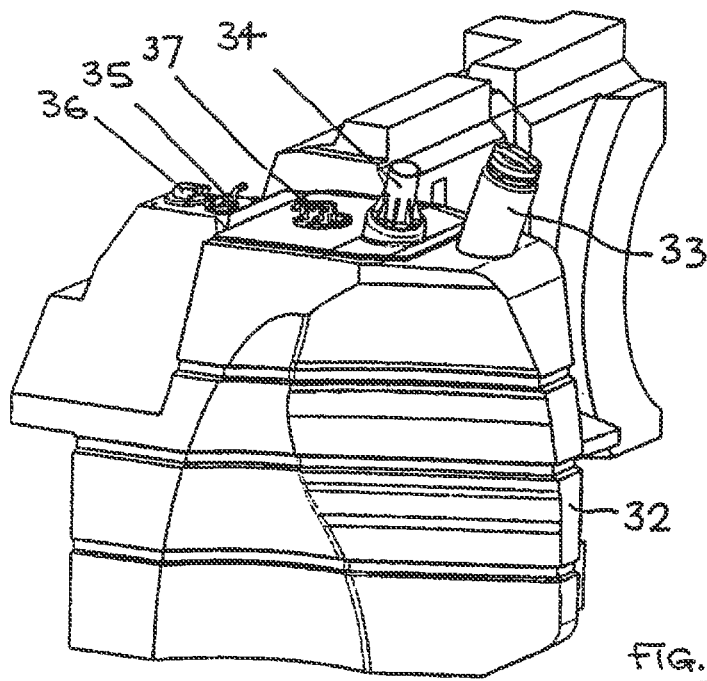
FIGS. 2 & 3 show perspective and part-sectional views through a combined fuel and urea tank in accordance with a second aspect of the present invention.
Figure 3:
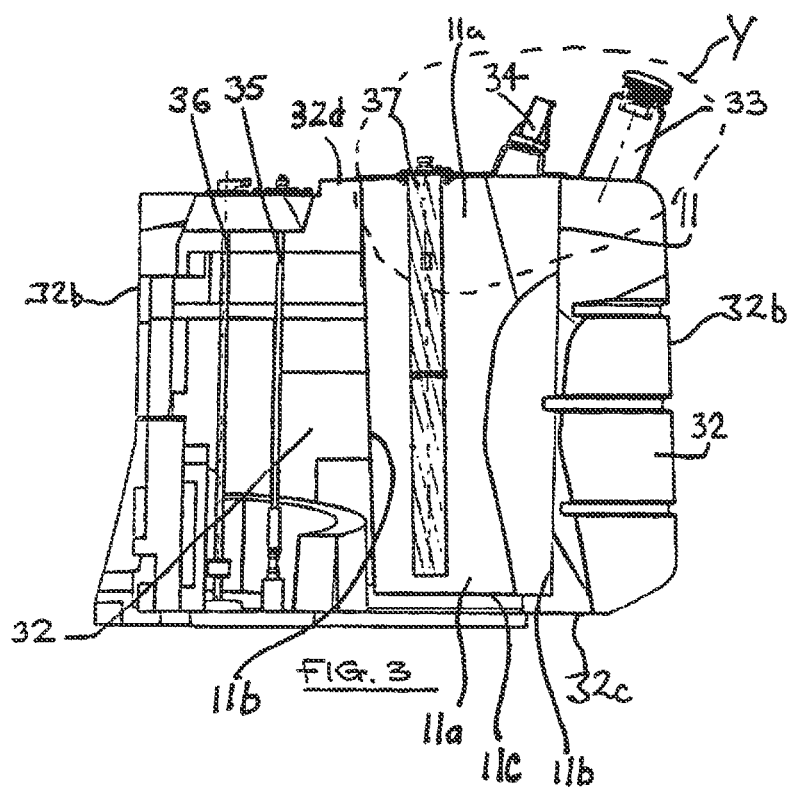

In a preferred arrangement shown in FIGS. 2 & 3, the urea tank 11 is completely surrounded by the fuel tank 32 to provide maximum heat insulation. In certain tank configurations the urea tank may not be surrounded by the fuel tank but simply immediately adjacent thereto (with the urea tank being divided from the fuel tank by a common wall for example) so that the urea tank is shielded from the direct heating effects of the sun and the heating effects of the exhaust of the engine and the cooling air of the engine as discussed above.

Figure 4:
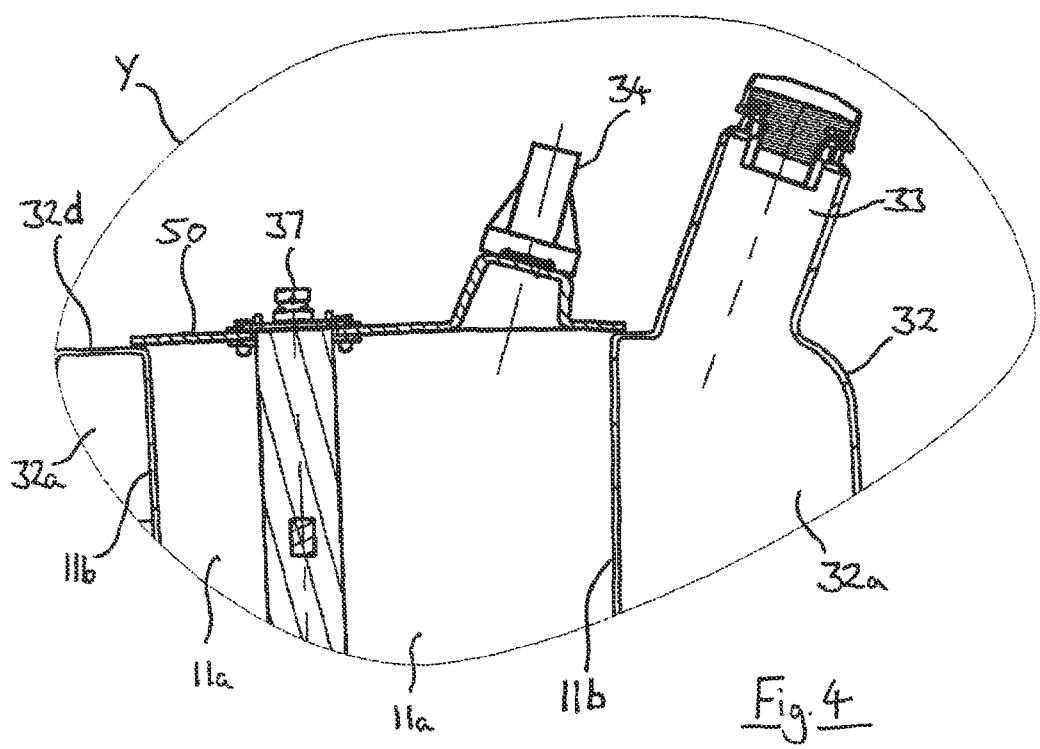
FIG. 4 shows an enlarged view of part Y shown in FIG. 3.

In FIGS. 2, 3 and 4, the fuel tank 32 has a fuel filler spout 33 and the urea tank 11 has a urea filler spout 34. Fuel is drawn out of tank 32 via pipe 35 using a conventional electric fuel pump (not shown) and a fuel gauge 36 is also provided. A feed tube 37 is provided for the supply of urea to the module 12 from tank 11 via line 12*a* (FIG. 1). The return of any surplus urea from the supply module 12 to the tank 11 is via line 12*b* (FIG. 1).

The fuel tank 32 is formed from a single plastic structure manufactured by a rotational moulding process. Such processes are known and will not be described in detail. However, reference is invited to web page http://en.wikipedia.org/wiki/Rotational_molding for further details.

With reference to FIGS. 3 and 4, the fuel tank 32 is defined by a closed volume 32*a* having an outside surface 32*b*, a bottom surface 32*c* and a top surface 32*d*. Within the top surface 32*d* a concavity 11*a* is provided (also by the moulding process) which defines the volume for the urea tank 11. The concavity 11*a* includes near vertical walls 11*b* and a base 11*c*.

The concavity 11*a* is closed by a cover 50 which is secured to the top surface 32*d* of the fuel tank 32 by ultrasonic welding (FIG. 4). Therefore, the cover 50 is sealed around its edge to prevent leakage. The feed tube 37 is inserted and secured in the cover 50.

Alternatively, the cover 50 may be screwed to the tank 32. In this case, metal inserts may be provided in the tank 32 to receive the screws.

From reading the present disclosure, other modification will be apparent to persons skilled in the art. Such modifications may involve other features which are already known in the field of vehicle exhaust treatment systems and component parts therefore and which may be used instead of or in addition to features already described herein.

The invention claimed is:

1. A vehicle engine exhaust gas treatment system, comprising:
    storage means for storing urea;
    injector means for injecting urea into a catalytic converter located in an exhaust of an engine;
    an air duct via which air is drawn into the engine; and
    cooling means for cooling the urea on its passage from the storage means to the injector means, the cooling means comprising a heat exchanger which includes an inner pipe through which the urea flows on its way to the injector means, the inner pipe extending within the air duct to cool the urea.

2. A system according to claim 1 in which the air is drawn into the engine via an air filter and the inner pipe extends within the air duct on one or both sides of the air filter to increase the cooling effect on the urea.

3. A system according to claim 1, further comprising an air compressor, the urea being additionally or alternatively cooled by exposing the inner pipe to the flow of air which is being drawn into the compressor.

4. A system according to claim 1 further comprising a fuel tank for the supply of fuel to an engine and the urea storage means comprises a urea tank located relative to the fuel tank so that the fuel in the fuel tank at least partially insulates the urea from a heating effect of the sun and other heat sources.

5. A system according to claim 4, in which the urea tank is completely surrounded by fuel in the fuel tank to obtain a maximum insulating effect from the fuel.

6. A system according to claim 5, wherein the fuel tank is formed of moulded plastic wherein a wall of the fuel tank comprises a concavity which defines the volume of the urea storage tank, and wherein a closure element covers the concavity.

7. A system according to claim 6 herein the fuel tank is formed by a rotational moulding process.

* * * * *